United States Patent
Beckett

(10) Patent No.: US 7,090,236 B2
(45) Date of Patent: Aug. 15, 2006

(54) MOUNTING SYSTEM, SAIL, STEERING MECHANISM AND FRAME FOR A LANDSAILER

(75) Inventor: Paul Francis Beckett, Mount Maunganui (NZ)

(73) Assignee: Blokart International Limited, Mt. Mauganui (NZ)

( * ) Notice: Subject to any disclaimer, the term of this patent is extended or adjusted under 35 U.S.C. 154(b) by 0 days.

(21) Appl. No.: 10/220,847
(22) PCT Filed: Mar. 6, 2001
(86) PCT No.: PCT/NZ01/00033
§ 371 (c)(1), (2), (4) Date: Nov. 20, 2002
(87) PCT Pub. No.: WO01/66404
PCT Pub. Date: Sep. 13, 2001

(65) Prior Publication Data
US 2003/0146615 A1    Aug. 7, 2003

(30) Foreign Application Priority Data

| Mar. 6, 2000 | (NZ) | 503192 |
|---|---|---|
| Jul. 10, 2000 | (NZ) | 505669 |

(51) Int. Cl.
*B62M 1/00* (2006.01)
*B63H 9/00* (2006.01)
(52) U.S. Cl. .............. 280/213; 114/39.12; 114/97
(58) Field of Classification Search ............ 280/213; 114/39.12, 102.1, 97, 98, 102.12; 180/213; B62B 15/00
See application file for complete search history.

(56) References Cited

U.S. PATENT DOCUMENTS

| 481,614 A | * | 8/1892 | Comstock | 114/102.1 |
| 3,026,121 A | * | 3/1962 | Ellam | 280/16 |
| 3,572,740 A | | 3/1971 | Rypinski | |
| 3,820,493 A | * | 6/1974 | Amick | 114/39.29 |
| 3,986,722 A | | 10/1976 | Patterson | |
| 4,311,107 A | * | 1/1982 | Imre | 114/39.15 |

(Continued)

FOREIGN PATENT DOCUMENTS

DE    2714197 A1    10/1978

(Continued)

OTHER PUBLICATIONS

Derwent Abstract Accession No. 1999-632345/54, class P36, SE 9800634 A (Folcker) Sep. 3, 1999.

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

A mounting system for a boom (14) of a landsailer (1) includes a resilient flexible member (12), at one end engageable with a rearward portion of the landsailer frame (2) and at the other end with the main sheet (13). A steering mechanism includes a shaft (6) which extends through an aperture (5a) in the mast (3) or mast receptacle (3a) and an aperture (5b) in the frame (2). A wheel (8) is connected to one end of the shaft (6) and the driver operates the other end of the shaft (6). The frame (2) includes a cockpit section (20), mast receptacle (3a), saddle frame (10) and steering section (21) each engageable to form the landsailer frame (2). The dimensions of each part of the mast receptacle (3a), saddle frame (10) and steering section (21) are equal or smaller than the dimensions of the cockpit section (20). The sail (4) includes a pocket (17) to receive the boom (14), and a lower sail portion (4a) extending below the pocket (17).

6 Claims, 3 Drawing Sheets

U.S. PATENT DOCUMENTS

| | | | |
|---|---|---|---|
| 4,332,395 A | | 6/1982 | Zech |
| 4,408,772 A | * | 10/1983 | Hollwarth .................. 280/1 |
| 4,424,759 A | * | 1/1984 | Dolence ..................... 114/97 |
| 4,503,797 A | * | 3/1985 | Maurin ..................... 114/106 |
| 4,541,355 A | * | 9/1985 | Denton ................... 114/39.13 |
| 4,557,495 A | * | 12/1985 | Kindermann ............... 280/213 |
| 4,625,672 A | * | 12/1986 | Jackson .................... 114/111 |
| 4,653,417 A | * | 3/1987 | White ........................ 114/91 |
| 5,001,999 A | * | 3/1991 | Morrelli .................. 114/39.12 |
| 5,134,952 A | * | 8/1992 | Doolittle ................. 114/39.12 |
| 5,638,763 A | * | 6/1997 | Kelsey ..................... 114/105 |
| 5,806,451 A | * | 9/1998 | Carn ..................... 114/102.12 |
| 5,971,414 A | | 10/1999 | Borzage |

FOREIGN PATENT DOCUMENTS

| | | | | |
|---|---|---|---|---|
| DE | 2802340 | A1 | | 7/1979 |
| DE | 2802471 | A | * | 7/1979 |
| DE | 2912867 | A | * | 10/1980 |
| DE | 2912867 | A1 | | 10/1980 |
| DE | 2950844 | A1 | | 6/1981 |
| DE | 3201847 | A1 | | 8/1983 |
| DE | 3342911 | A1 | | 6/1985 |
| DE | 29713936 | U1 | | 11/1997 |
| FR | 2550151 | A1 | | 2/1985 |
| FR | 2613678 | A1 | | 10/1988 |
| FR | 2622524 | A1 | * | 5/1989 |
| FR | 2695368 | A1 | * | 3/1994 |
| GB | 2202495 | A | | 9/1988 |
| WO | WO 96/25317 | A1 | | 8/1996 |
| WO | WO 97/29008 | A1 | | 8/1997 |

* cited by examiner

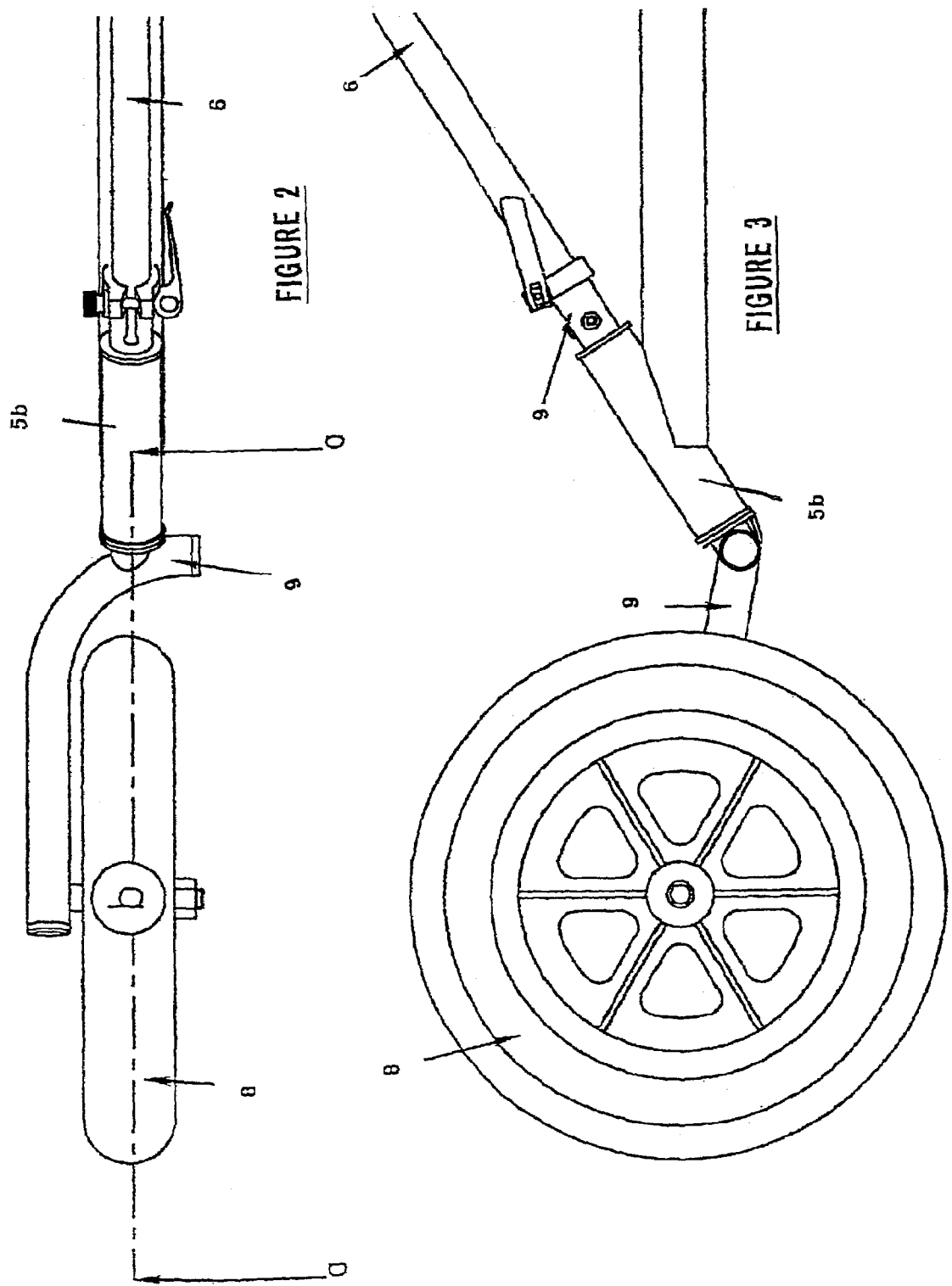

MOUNTING SYSTEM, SAIL, STEERING MECHANISM AND FRAME FOR A LANDSAILER

This application is the national phase under 35 U.S.C. § 371 of PCT International Application No. PCT/NZ01/00033 which has an International filing date of Mar. 6, 2001, which designated the United States of America.

BACKGROUND

Landsailers are well known recreational transport devices which utilise sail power for propulsion. The use of landsailers has gained in popularity over recent times as a recreational and sporting activity.

In comparing landsailers to yachts, a fundamental difference is that yachts can easily heal over in response to lateral forces applied by the wind on the sails. This healing action helps to absorb impact forces caused by changes in wind strength as well as reducing the apparent area of the sail or sails. As a landsailer must travel over solid ground, its ability to heal over in response to these lateral forces is limited. If the land vehicle does heal over it tends to be unstable as its resistance to movement is low and hence the landsailer tends to capsize.

Thus, if there is a sudden gust of wind or a sudden change in wind angle, then there is a risk that the landsailer will capsize. One situation where this is particularly apparent is when the landsailer is travelling at a low speed relative to the wind velocity. If the landsailer attempts to gybe at this low speed, the shock of the sail and boom moving into the new position can be sufficient to capsize the landsailer. This risk of capsizing limits the manoeuvrability of the landsailer, creating a disadvantage, particularly in a race situation.

Other factors which influence the performance of a landsailer include the weight of the body of the landsailer in proportion to its sail area and whether the sail can be maintained with accurate camber to give optimum power from the sail.

A problem with landsailers is that they are typically large and therefore difficult to store, handle and transport. This can reduce the enjoyment of use of the landsailer for recreational purposes. Also, many landsailers are difficult and time consuming to erect. Further, landsailers at present are typically complex devices which involve significant costs of manufacture.

OBJECT OF THE INVENTION

Thus, it is an object of the present invention to overcome or at least alleviate problems in landsailers at present or at least to provide the public with a useful choice.

Further objects of the present invention may become apparent from the following description.

SUMMARY OF THE INVENTION

According to one aspect of the present invention, there is provided a mounting system for a boom of a landsailer, the boom including a first end suitable to be secured to a mast and a second end engageable with a main sheet, the mounting system including a resilient flexible member securely engageable with a rearward portion of the frame of the landsailer at a first end thereof and securely engageable at a second end to the main sheet.

Preferably, the resilient flexible member is mounted substantially towards the longitudinal centre of the landsailer.

Preferably, the frame includes a receptacle located and dimensioned to receive the first end of the flexible member in order to securely engage the resilient member to the frame of the landsailer.

Preferably, the frame and flexible member are located, oriented and dimensioned in use so that the second end of the flexible member when secured to the frame is positioned such above head height of a person operating the landsailer.

Preferably, the resilient flexible member is oriented so that the second end is angled away from the mast to which the boom is attached by a specified extent.

Preferably, the flexible member is oriented at an angle substantially 45° to the vertical.

According to another aspect of the present invention, there is provided a sail for a landsailer, the sail including a pocket or aperture adapted to receive the boom of the landsailer, the sail further including a portion extending below said aperture or pocket.

Preferably, the sail is adapted to have tension applied to the portion of the sail extending below the boom so as to act as a vang.

Preferably the portion of the sail below the boom may be secured to the frame of the landsailer at a variable tension.

Preferably, the foot of the sail is secured to the frame of the landsailer through a down-haul extending downwards and substantially forward of the leading edge of the sail.

Preferably, the down-haul may be secured to the frame of the landsailer through a cleat accessible from a cockpit, thereby allowing variation of the tension applied to the down-haul while the landsailer is in motion.

According to another aspect of the present invention, there is provided a steering mechanism for a landsailer having a mast or mast engagement means extending from a frame, the mechanism including a shaft having a first end adapted to be held and controlled by a driver of the landsailer and a second end adapted to be connected to a wheel of the landsailer, wherein the shaft extends through an aperture in the mast or mast receptacle and an aperture in the frame of the landsailer.

Preferably, the shaft includes a bend between the portion of the shaft which extends through the aperture in the mast or mast receptacle and the first end of the shaft.

Preferably, the steering mechanism includes a connector portion to connect a wheel to the shaft, the connector portion adapted to provide rotation of the wheel in use around two orthogonal axes upon rotation of the shaft.

Preferably, the connector portion is adapted to rotate the wheel simultaneously about a substantially horizontal and substantially vertical axis upon rotation of the shaft.

According to another aspect of the present invention, there is provided a landsailer frame including a cockpit section, a mast receptacle, saddle frame and a steering section wherein the mast receptacle, saddle frame and steering section are formed from one or more parts removably engageable to form the frame, wherein each part has substantially equal or smaller dimensions than the cockpit section.

Preferably, the landsailer frame further includes a mast and a boom, each formed from a plurality of sections, wherein each section has a length substantially equal to or less than the greater of the length or width of the cockpit section.

Preferably, the cockpit forms part of a container adapted to hold the mast receptacle, saddle frame and steering section for transport of the landsailer frame.

Preferably, the cockpit is adapted to also hold-at least the boom and mast sections of the landsailer.

Preferably, the cockpit is adapted to further hold wheels of the landsailer.

Preferably, the cockpit includes two apertures substantially adjacent two axle mountings of the landsailer frame wherein an axle may protrude from each of the mountings through the apertures to engage with wheels.

Preferably, at least a portion of the cockpit adjacent the mountings may be at least partially rectangular in form and the axle receptacles and apertures may be located substantially towards a longitudinal edge of the cockpit at opposite edges of the cockpit.

Preferably, the saddle frame is pivotally engaged with the cockpit section, wherein the saddle frame is collapsible down onto the cockpit section for storage.

Further aspects of the present invention may become apparent from the following description, which is given by way of example only and in which reference is made to the accompanying drawings.

BRIEF DESCRIPTION OF THE DRAWINGS

FIG. 2: shows a plan view of the steering mechanism according to one embodiment of the present invention.

FIG. 3: shows a side view of the steering mechanism according to one embodiment of the present invention

DETAILED DESCRIPTION OF PREFERRED EMBODIMENTS OF THE INVENTION

Figure 1:
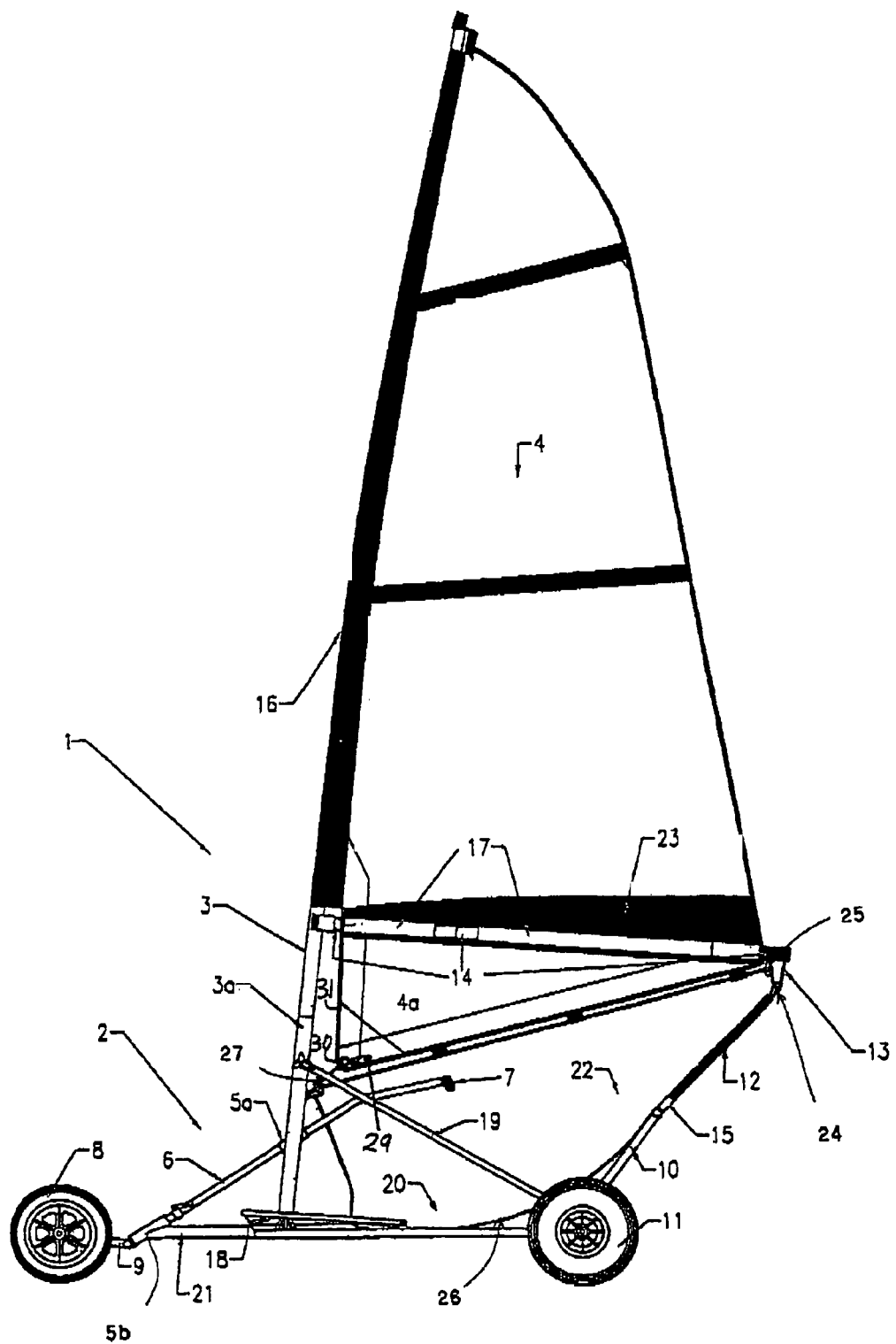
FIG. 1: shows a side view of a landsailer according to one aspect of the present invention.

Referring first to FIG. 1 of the accompanying drawings, a schematic representation of a side view of a landsailer, generally referenced 1 is shown. The landsailer includes a frame generally referenced 2, a mast 3 within a mast receptacle 3a and a sail 4.

The frame 2 includes a cockpit section 20, a steering section 21 and a saddle section 22. The mast receptacle 3a includes an aperture 5a and the steering section 21 includes an aperture 5b. A tiller arm or shaft 6 is inserted through apertures 5a and 5b. The apertures 5a and 5b securely hold the shaft 6 in place, while allowing rotation of the shaft 6. The shaft 6 includes a handle 7 which the driver uses to control the direction of movement of the landsailer 1. A bend may be provided in the shaft 6 between the portion inserted in aperture 5a and the handle 7 to allow movement of handle 7 along an arc to effect rotational movement of the shaft 6. This steering mechanism provides a simple construction with increased control and the mast receptacle 3a provides a convenient centre point in which to support the shaft 6.

Referring to FIGS. 2 and 3, a portion of the steering section 21 is shown. The shaft 6 is connected to a wheel 8 by a connector 9. The connector 9 positions the wheel 8 along the centre line of the landsailer 1. By rotating the shaft 6 by movement of the handle 7, the wheel 8 is thus rotated about two axes referenced a—a and b. It will be appreciated by those skilled in the art, that this steering mechanism allows easy construction and disassembly of the landsailer 1. Also, the construction of the steering mechanism minimises the number of parts involved and therefore reduces the weight of the frame 2. The shaft 6 may be formed partly by the connector 9 in that the connector 9 extends through aperture 5b and engages with the shaft 6 on the distal side of aperture 5b. This allows simpler assembly of the landsailer 1.

Referring again to FIG. 1, the saddle section 22 includes a saddle frame 10 extending between the rear wheels 11. A seat sling 26 is connectable between the saddle frame 10 and the cockpit section 20 to provide support for a rider of the landsailer 1. Also attached to the saddle frame 10 is a resilient flexible member 12, which extends out the rear of the landsailer 1 above the head of the driver.

A mainsheet 13, connectable at a first end to the distal end of the boom 14, is routed through a pulley 24 connectable to the end of the flexible member 12. The mainsheet 13 may then be routed through a further pulley 25 substantially adjacent to the end of the boom 14, and then through such other pulleys as may be necessary to route the mainsheet 13 into a convenient position for use by the driver of the landsailer 1.

The flexible member 12, may be inserted into a receptacle 15 provided at the centre of the saddle frame 10. When the landsailer 1 gybes, the movement of the boom 14 from the first tack to the second tack may create a jarring force when the main sheet 13 becomes taut. This jarring force is partially absorbed by the flexible member 12, which flexes in response to the force. The flexing of the flexible member 12 results in some give in the landsailer 1, assisting to prevent capsizing and to prevent excessive shock loading to the frame 2. Once the jarring force has been absorbed, the flexible member 12 provides a reaction force against the mainsheet 13, which acts to keep the boom 14 in the required position. If the flexible member 12 is sufficiently flexible, it may also act to absorb wind gusts to some extent, making the landsailer 1 more stable.

In order to minimise the rigging required between the sail 4 and the boom member 14, in addition to a pocket 16 for the mast, a pocket 17 is provided in the sail 4. The boom 14 is inserted into the pocket 17. This arrangement further simplifies construction of the landsailer 1 and again reduces the number and complexity of the components.

A shelf 23 may be provided in the sail 4 to provide a suitable profile of the sail 4 in use.

The sail 4 has a lower portion 4a which extends below the line of the boom 14. This is secured to the frame 2 of the landsailer 1 by a down-haul 27 which may be secured to an eye 30 at the foot and leading edge 31 of the lower portion of the sail 4a. In this way the lower portion of the sail 4a can act as a boom vang, preventing the boom 14 from pivoting upwards. In addition, the lower portion 4a also applies an inwards force, tensioning the sail. This dual function of the lower portion of the sail 4a simplifies the rigging involved, allowing easier and faster assembly and disassembly of the landsailer 1. The down-haul 27 may be secured to a cleat 29 or similar device to allow the tension to be varied as required. The cleat 29 may be positioned so as to be accessible by a driver while the landsailer 1 is in motion.

The wheels 11 may be secured to the landsailer 1 by sub axles (not shown) attached to longer flexible axles (not shown) to provide suspension. The flexible axles are preferably removable from the sub axles so that the sub axles may be used as part of a trundler (see herein below).

The saddle frame 10 is pivotally engaged with the cockpit section 20, for example through the use of pins through the saddle frame 10 and adjacent member of the cockpit section 20. This saddle frame 10 is also dimensioned so that it fits within the area of the cockpit section 20 when folded down.

To collapse the landsailer 1 into a portable unit, the steering section 21 may be disengaged with the cockpit section 20 at or near point 18. The individual components of the steering section 21 may also be disassembled and placed within the cockpit section 20. The shaft 6 is disconnected from the connector 9 and removed from aperture 5a. The support struts 19 are disengaged from the mast receptacle 3a and may be folded down onto the cockpit section 20. The mast receptacle 3a may also be folded down or alternatively disengaged from and placed on top of the cockpit section 20. The saddle frame 10 is folded down and the components making up the shaft 6, mast 3, and boom 14 are placed on the cockpit section 20.

The wheels 8, 11 may also be placed on the cockpit section 20 for carrying the landsailer 1 in a bag or other suitable carrier. Alternatively, the bag may include apertures opposite receptacles in the cockpit section 20, so that an axle may be placed in the receptacles and a wheel secured to the axle to allow the bag to act as trundler for easy portage of the disassembled landsailer 1.

Figure 4:
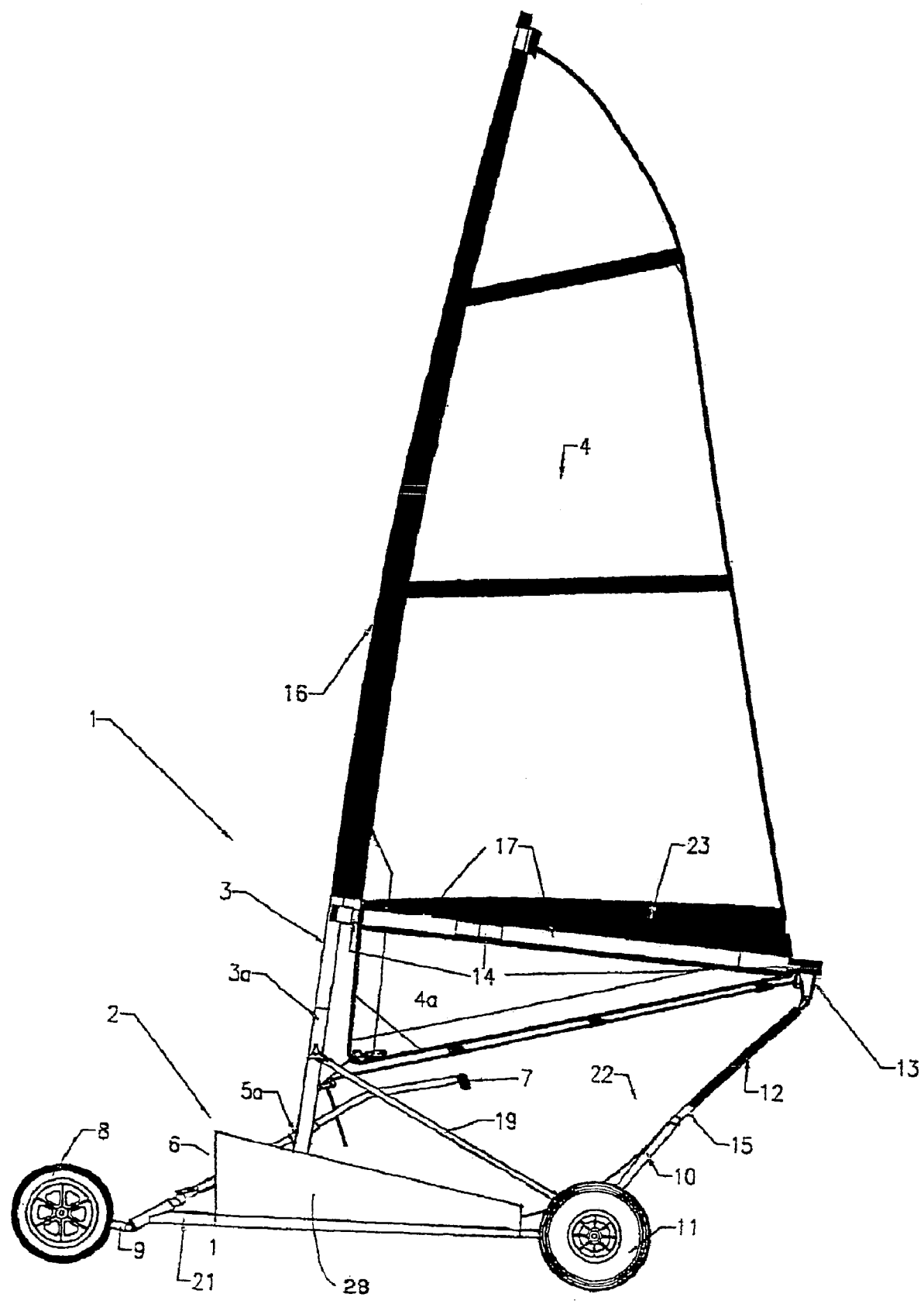
FIG. 4: shows a side view of a landsailer with the cockpit forming part of a rigid cover according to one aspect of the present invention.

The cockpit section 20 may be constructed from a rigid or a soft material. In one embodiment shown in FIG. 4, the cockpit section 20 may be rigid and include a rigid cover 28 so that the overall container may be secured to a roof rack of a vehicle. Alternatively, a soft material may be preferred if the landsailer 1 is to be transported more by hand.

Where in the foregoing description, reference has been made to specific components or integers of the invention having known equivalents then such equivalents are herein incorporated as if individually set forth.

Although the invention has been described by way of example and with reference to particular embodiments, it is to be understood that modifications and/or improvements may be made without departing from the scope of the invention as defined in the appended claims.

The invention claimed is:

1. A sail for a landsailer, comprising:
   a pocket or aperture, the pocket or aperture extending substantially from a leading edge of the sail to a trailing edge of the sail, the pocket or aperture having a closed end at a bottom thereof and being dimensioned to receive a boom; and
   a portion extending from and below the closed end of the aperture or pocket,
   wherein the sail is adapted to have tension applied to the portion of the sail extending below the boom so as to act as a vang,
   wherein the portion extending below the boom is secured to a landsailer by a tensioning device that allows variable tension to be applied to the portion extending below the boom.

2. The sail of claim 1, wherein the portion extending below the boom is secured to the frame of the landsailer through a down-haul extending downwards and forward of the leading edge of the sail.

3. The sail of claim 2, wherein the down-haul is secured to a frame of the landsailer through a cleat accessible from a cockpit, thereby allowing variation of the tension applied to the down-hail by an operator while the landsailer is in motion.

4. The sail of claim 1, further including a shelf located immediately above said pocket or aperture.

5. A kit of parts comprising:
   a frame;
   a mast;
   a boom of a landsailer; and
   a sail, the sail including a first pocket or aperture, a second pocket or aperture, and a lower portion, the first pocket or aperture having a closed end at a bottom thereof and being adapted to receive the boom, the first pocket or aperture being formed by at least one part, the first pocket or aperture extending so as to be proximate both a leading edge of the sail and a trailing edge of the sail, the second pocket or aperture extending along the leading edge of the sail to receive the mast, the lower portion extending from and below the closed end of the first pocket or aperture, when the first and second pockets or apertures are mounted on the mast and boom respectively, a tensioned downhaul provided so as to extend forwards and downwards from the leading edge of the lower portion of the sail tensioning the sail and causing the lower portion of the sail to act as a boom vang.

6. The kit of parts of claim 5, wherein the first pocket or aperture is an aperture open towards both the leading edge and trailing edge of the sail.

* * * * *